(12) United States Patent
Achar et al.

(10) Patent No.: US 12,493,794 B2
(45) Date of Patent: Dec. 9, 2025

(54) ENCODER DECODER BASED RNN LEARNING FOR MULTI-STEP TIME SERIES FORECASTING IN PRESENCE OF MISSING DATA

(71) Applicant: Tata Consultancy Services Limited, Mumbai (IN)

(72) Inventors: Avinash Achar, Chennai (IN); Soumen Pachal, Chennai (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 1023 days.

(21) Appl. No.: 17/399,165

(22) Filed: Aug. 11, 2021

(65) Prior Publication Data
US 2022/0343173 A1 Oct. 27, 2022

(30) Foreign Application Priority Data
Mar. 16, 2021 (IN) .............................. 202121011143

(51) Int. Cl.
| | | |
|---|---|---|
| G06N 3/084 | (2023.01) | |
| G06N 3/044 | (2023.01) | |
| G06N 3/0442 | (2023.01) | |
| G06N 3/045 | (2023.01) | |
| G06N 3/0455 | (2023.01) | |
| G06N 3/088 | (2023.01) | |
| G06N 3/09 | (2023.01) | |

(52) U.S. Cl.
CPC ............. *G06N 3/084* (2013.01); *G06N 3/044* (2023.01); *G06N 3/045* (2023.01); *G06N 3/088* (2013.01)

(58) Field of Classification Search
CPC ........ G06N 3/084; G06N 3/044; G06N 3/045; G06N 3/088
See application file for complete search history.

(56) References Cited

U.S. PATENT DOCUMENTS 10,592,368 B2  3/2020  Guo et al.

OTHER PUBLICATIONS

Jaitly, Navdeep, Quoc V. Le, Oriol Vinyals, Ilya Sutskever & Samy Bengio, "An Online Sequence-to-Sequence Model Using Partial Conditioning", 2015, arXiv, pp. 4-6 (Year: 2015).*

(Continued)

*Primary Examiner* — Shahid K Khan
*Assistant Examiner* — Skylar K Vanwormer
(74) *Attorney, Agent, or Firm* — Finnegan, Henderson, Farabow, Garrett & Dunner, LLP (57) ABSTRACT

This disclosure relates generally to a method and system for encoder decoder based RNN learning for time series forecasting in presence of missing data. The present disclosure employs atleast one multi-layer RNN encoder and a decoder for time series forecasting. The method receives a plurality of input data comprising a sequential data transformed into a plurality of windows to obtain a plurality of features. Further, the plurality of features is segregated into an available data blocks and a missing data blocks. The first multi-layer RNN encoder fetches the available data blocks and the second multi-layer RNN encoder fetches the missing data blocks to forecast the target variable from the multi-step time series data. The decoder input is generated by appending the combined context vector with an exogeneous variable at each time step.

12 Claims, 6 Drawing Sheets

(56) References Cited

OTHER PUBLICATIONS

Tain, Yan, Kaili Zhang, Jlanyuan Li, Xianxuan Lin and Bailin Yang, "LSTM-based traffic flow prediction with missing data", 2018, Elsevier, pp. 298-304 (Year: 2018).*

Du, Shengdong, Tianrui Ii, Yan Yang and Shi-Jinn Horng, "Multivariate time series forecasting via attention-based encoder-decoder framework", 2020, Elsevier, p. 272 (Year: 2020).*

Engels, Jean Mundahl and Paula Diehr, "Imputation of missing longitudinal data: a comparison of methods", Oct. 2002, Elsevier, p. 970 (Year: 2002).*

Noor, M.N., A.S. Yahaya, N.A. Ramli and A.M. Mustafa Al Bakri, "Filling Missing Data Using Interpolation Methods: Study on the Effect of Fitting Distribution", Dec. 2013, Scientific, p. 890 (Year: 2013).*

Yonghua Zhu et al., "A novel approach to workload prediction using attention-based LSTM encoder-decoder network in cloud environment", EURASIP Journal on Wireless Communications and Networking, Dec. 2019, Springer, https://www.researchgate.net/publication/338000180_A_novel_approach_to_workload_prediction_using_attention-based_LSTM_encoder-decoder_network_in_cloud_environment/link/5fc46844a6fdcc6cc68400f2/download.

* cited by examiner

ENCODER DECODER BASED RNN LEARNING FOR MULTI-STEP TIME SERIES FORECASTING IN PRESENCE OF MISSING DATA

PRIORITY CLAIM

This U.S. Patent application claims priority under 35 U.S.C § 119 to Indian patent application no. (202121011143), filed on Mar. 16, 2021. The entire contents of the aforementioned application are incorporated herein by reference.

TECHNICAL FIELD

The disclosure herein generally relates to data prediction, and, more particularly, to method and system for encoder decoder based RNN learning for multi-step time series forecasting in presence of missing data.

BACKGROUND

Real valued multi variate time series allows to characterize the evolution of complex systems and is the core component in many research fields and application domain. Multivariate time series data are ubiquitous in real world dynamic systems where merging of irregular data is often plagued by missing values. As missing values may arise due to a variety of reasons and in time series analysis it is important to handle missing values and are usually filled with imputation techniques. However, imputation destroys useful information contained in the missingness patterns. However, a scalable and performance efficient technique is necessary for predicting time series data.

In one existing method, imputation for time series either impute the data first and then predict OR try and learn both the imputing structure and the model simultaneously. In many time series scenarios, nature of data missingness could be such that when data is missing, it mostly happens in a medium/large window of consecutive time points. In such scenarios imputing the data is inaccurate especially at time points into the input window. Further if the underlying time series has a high total variation, these imputation errors are more pronounced. Ideally, different approaches are applied depending on the missing mechanisms. For example, if the data is missing completely random or if the amount of missing data rate is low, then such missing values are deleted. Further, if the missing data rate is high, then the missing data values are imputed with mean and such mean imputation provides inaccurate results.

SUMMARY

Embodiments of the present disclosure present technological improvements as solutions to one or more of the above-mentioned technical problems recognized by the inventors in conventional systems. For example, in one embodiment, a system for encoder decoder based RNN learning for multi-step time series forecasting in presence of missing data is provided. The system includes receiving, a plurality of input data comprising a sequential data transformed into a plurality of windows, wherein each window is splitted into a plurality of features and a target window. Further, the plurality of features into atleast one of (i) a one or more available data blocks and (ii) a one or more missing data blocks. From the plurality of features a first context vector is obtained, from a first multi-layer RNN encoder encoded with the one or more available data blocks and a second context vector is obtained from a second multi-layer RNN encoder encoded with the one or more missing data blocks. Then, a combined context vector is generated based on (i) the first context vector from the first multi-layer RNN encoder, and (ii) the second context vector from the second multi-layer RNN encoder. Further a target variable from the multi-step time series data is forecasted using a decoder by, generating, the decoder input by appending the combined context vector with exogenous variables at every time step, and training using a back propagation through time (BPTT), a plurality of network parameters based on a loss function.

In another aspect, a method for encoder decoder based RNN learning for multi-step time series forecasting in presence of missing data is provided. The method includes receiving, a plurality of input data comprising a sequential data transformed into a plurality of windows, wherein each window is splitted into a plurality of features and a target window. Further, the plurality of features into atleast one of (i) a one or more available data blocks and (ii) a one or more missing data blocks. From the plurality of features a first context vector is obtained, from a first multi-layer RNN encoder encoded with the one or more available data blocks, and a second context vector is obtained from a second multi-layer RNN encoder encoded with the one or more missing data blocks. Then, a combined context vector is generated based on (i) the first context vector from the first multi-layer RNN encoder, and (ii) the second context vector from the second multi-layer RNN encoder. Further a target variable from the multi-step time series data is forecasted using a decoder by, generating, the decoder input by appending the combined context vector with exogenous variables at every time step, and training using a back propagation through time (BPTT), a plurality of network parameters based on a loss function.

In yet another aspect, provides one or more non-transitory machine readable information storage mediums comprising one or more instructions, which when executed by one or more hardware processors perform actions includes receiving, a plurality of input data comprising a sequential data transformed into a plurality of windows, wherein each window is splitted into a plurality of features and a target window. Further, the plurality of features into atleast one of (i) a one or more available data blocks and (ii) a one or more missing data blocks. From the plurality of features a first context vector is obtained, from a first multi-layer RNN encoder encoded with the one or more available data blocks, and a second context vector is obtained from a second multi-layer RNN encoder encoded with the one or more missing data blocks. Then, a combined context vector is generated based on (i) the first context vector from the first multi-layer RNN encoder, and (ii) the second context vector from the second multi-layer RNN encoder. Further a target variable from the multi-step time series data is forecasted using a decoder by, generating, the decoder input by appending the combined context vector with exogenous variables at every time step, and training using a back propagation through time (BPTT), a plurality of network parameters based on a loss function.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Embodiments herein provide a method and system for encoder decoder based RNN learning for multi-step time series forecasting in presence of missing data. The method disclosed, enables to forecast accurately a target variable. The method of the present disclosure is based on employing atleast one multi-layer RNN encoder and a decoder for time series forecasting. Here, the system receives the plurality of input data and processes to segregate into an available data block and a missing data block. The first multi-layer RNN encoder fetches a one or more available data blocks and a second multi-layer RNN encoder fetches a one or more missing data blocks from the plurality of input data. The multi-layer RNN encoders, encode the information from the plurality of input data comprising a sequential data transformed into a plurality of windows without imputation. Also, the system and method of the present disclosure is time efficient, accurate and scalable for time series forecasting of the target variable. The disclosed system is further explained with the method as described in conjunction with FIG. 1 to FIG. 5B below.

Referring now to the drawings, and more particularly to FIG. 1 through FIG. 5B, where similar reference characters denote corresponding features consistently throughout the figures, there are shown preferred embodiments and these embodiments are described in the context of the following exemplary system and/or method.

Figure 1:
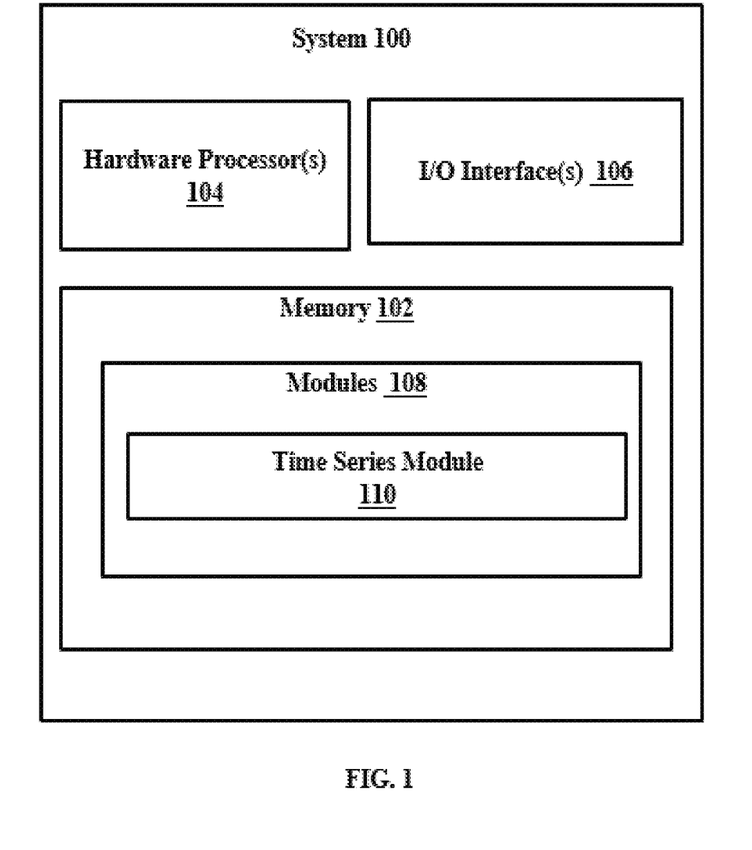
FIG. 1 illustrates an exemplary block diagram of a system (alternatively referred as multi-step time series forecasting system), in accordance with some embodiments of the present disclosure.

FIG. 1 illustrates an exemplary block diagram of a system (alternatively referred as multi-step time series forecasting system), in accordance with some embodiments of the present disclosure. In an embodiment, the time series prediction system 100 includes processor (s) 104, communication interface (s), alternatively referred as or input/output (I/O) interface(s) 106, and one or more data storage devices or memory 102 operatively coupled to the processor (s) 104. The system 100, with the processor(s) is configured to execute functions of one or more functional blocks of the system 100. Referring to the components of the system 100, in an embodiment, the processor (s) 104 can be one or more hardware processors 104. In an embodiment, the one or more hardware processors 104 can be implemented as one or more microprocessors, microcomputers, microcontrollers, digital signal processors, central processing units, state machines, logic circuitries, and/or any devices that manipulate signals based on operational instructions. Among other capabilities, the processor(s) 104 is configured to fetch and execute computer-readable instructions stored in the memory. In an embodiment, the system 100 can be implemented in a variety of computing systems, such as laptop computers, notebooks, 10 hand-held devices, workstations, mainframe computers, servers, a network cloud, and the like.

The I/O interface(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface (s) 106 can include one or more ports for connecting a number of devices (nodes) of the system 100 to one another or to another server. The memory 102 may include any computer-readable medium known in the art including, for example, volatile memory, such as static random access memory (SRAM) and dynamic random access memory (DRAM), and/or nonvolatile memory, such as read only memory (ROM), erasable programmable ROM, flash memories, hard disks, optical disks, and magnetic tapes. The memory 102 comprises a plurality of modules 108 that includes a time series predictor module 110. The modules 108 can be an Integrated Circuit (IC) (not shown), external to the memory 102, implemented using a Field-Programmable Gate Array (FPGA) or an Application-Specific Integrated Circuit (ASIC). The names (or expressions or terms) of the modules of functional block within the modules 108 referred herein, are used for explanation and are not construed to be limitation(s). The modules 108 includes the time series time predictor module 110 for processing of a plurality of input data received from one or more external sources.

Figure 2:
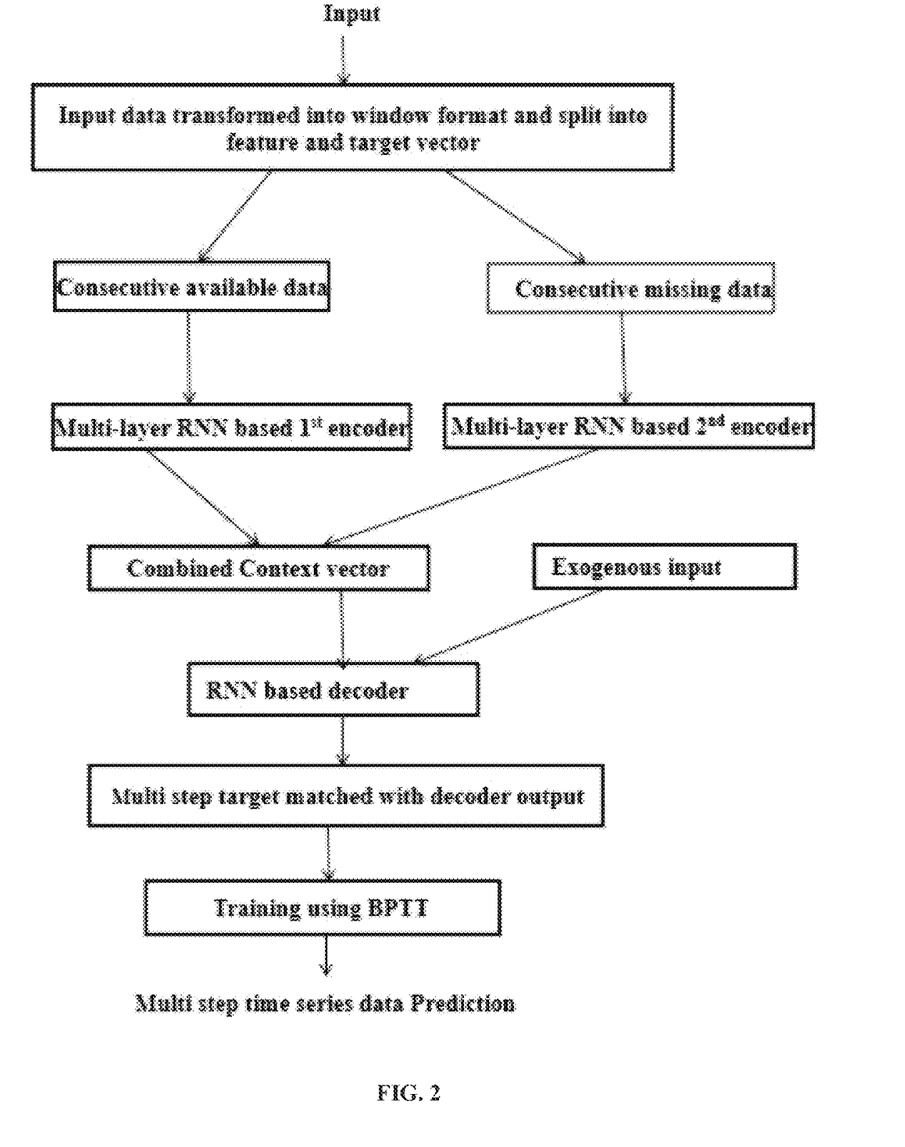
FIG. 2 illustrates a high-level overview of the encoder decoder RNN based multi-step time series forecasting system, in accordance with some embodiments of the present disclosure.

FIG. 2 illustrates a high-level overview of the encoder decoder RNN based multi-step time series forecasting system, in accordance with some embodiments of the present disclosure. The FIG. 2 includes a plurality of components comprising a first multi-layer RNN encoder, a second multi-layer RNN encoder, and a decoder. The plurality of input data is processed to obtain a plurality of features segregated into atleast one of the available data block and the missing data block. The first multi-layer RNN encoder processes the one or more available data blocks and the second multi-layer RNN encoder processes the one or more missing data blocks. Further, the first context vector from the first multi-layer RNN encoder and the second context vector from the second multi-layer RNN encoder are appended. The encoder inputs are selected without data imputation to the extent feasible. The decoder is unfolded into as many steps as the length of the prediction horizon. If the target variable at the first timestep of the decoder is missing, such a training example is ignored completely. However, this leads to severe loss of the training examples. Hence, we either choose a zero replacement of the missing values or to minimally impute based on a mean, a median or a suitable value. The present disclosure is further explained considering an example, where the system 100 forecasts the target variable from the plurality of input data using the system of FIG. 1 and FIG. 2.

Further, the memory 102 may comprises information pertaining to input(s)/output(s) of each step performed by the processor(s) 104 of the system 100 and methods of the present disclosure. Functions of the components of system 100, for time series prediction of target variable, are explained in conjunction with FIG. 3 through FIG. 5B providing flow diagram, architectural overviews, and performance analysis of the system 100.

Figure 3:
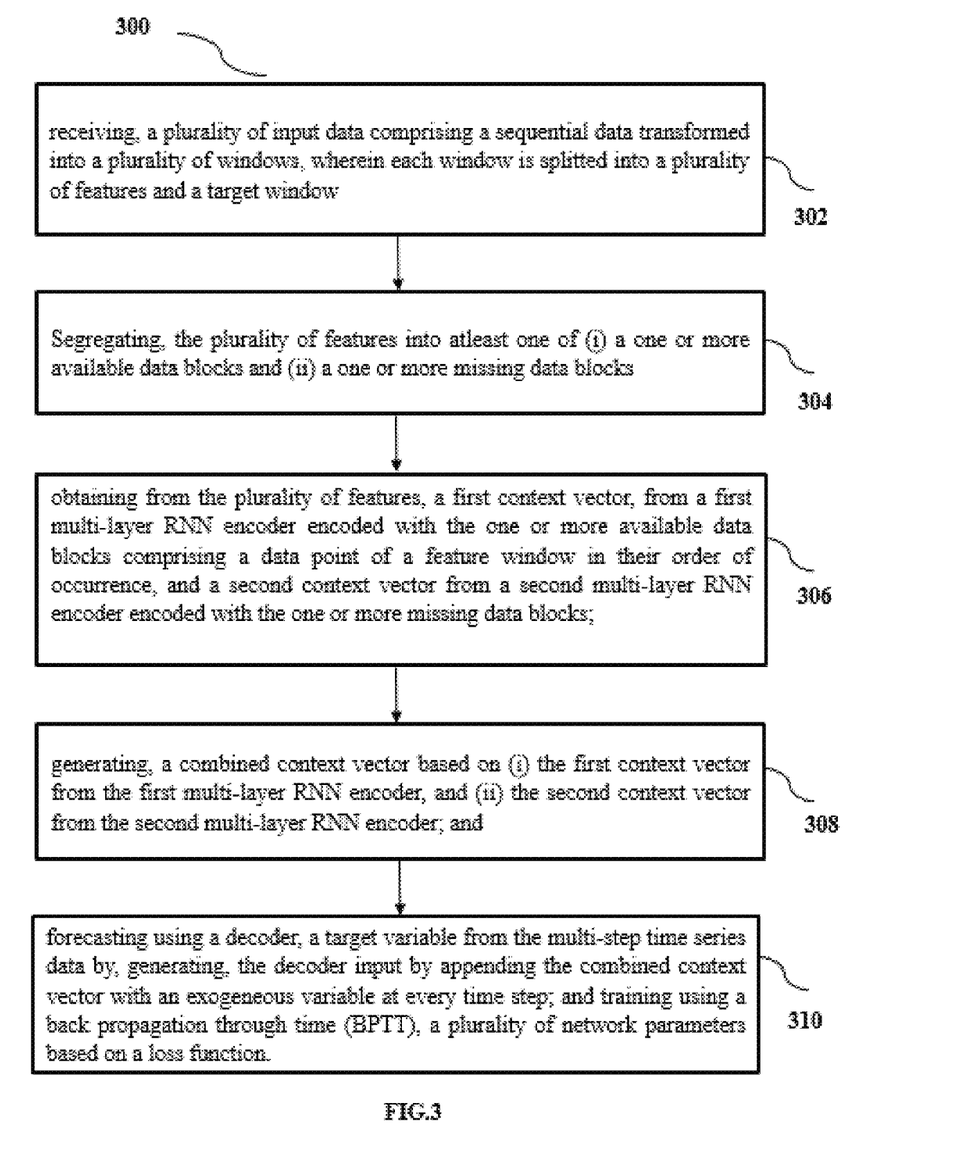
FIG. 3 depicts a flow diagram illustrating a method to generate multi-step time series forecasting of a target variable using the system of FIG. 1, in accordance with some embodiments of the present disclosure.

FIG. 3 depicts a flow diagram illustrating a method to generate multi-step time series forecasting of a target variable using the system of FIG. 1, in accordance with some embodiments of the present disclosure. In an embodiment, the system 100 comprises one or more data storage devices or the memory 102 operatively coupled to the processor(s) 104 and is configured to store instructions for execution of steps of the method 300 by the processor(s) or one or more hardware processors 104. The steps of the method 300 of the present disclosure will now be explained with reference to the components or blocks of the system 100 as depicted in FIG. 1 and FIG. 2 and the steps of flow diagram as depicted in FIG. 3. Although process steps, method steps, techniques or the like may be described in a sequential order, such processes, methods and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

Referring now to the steps of the method 300, at step 302, the one or more hardware processors 104 receive a plurality of input data comprising a sequential data transformed into a plurality of windows, wherein each window is splitted into a plurality of features and a target window. Considering an example 1 (FIG. 4) where the system receives the plurality of input data which is processed and sequentially fed into consecutive multi-layer RNN encoders to forecast the target variable. Here, the plurality of input data includes publicly available datasets from a well-known retail chain. The measurements are weekly sales at a department level of multiple departments. In addition to sales, there are other related measurements like CPI (consumer price index), mark-down price etc. which we use as exogenous variables for weekly sales prediction. Further, the sequences are ranked based on the total variation of the sales and top 20% of the sequences are considered (denoted as D1) for testing. The total variation of T length sequence x is defined as described below in equation 1, $$TV = \Sigma_{i=2}^{T} |x(i+1) - x(i)| \qquad \text{equation (1)}$$

In one embodiment of another example 2 having dataset 2 (D2), the weekly sales data at an item level from a brick and mortar retail chain of low moving items are collected over a predefined interval of time. It is identified that data is missing on account of no sales for a given week. In such scenario, the associated price (exogenous variable) does not get recorded as there are no transactions for that item in weeks of zero sales. It consists of 397 time-series obtained by assimilating all those items where the % of zero sale weeks was between 20%-50%.

Referring now to the steps of the method 300, at step 304, the one or more hardware processors 104 segregate the plurality of features into at least one of (i) a one or more available data blocks and (ii) a one or more missing data blocks.

In one embodiment, now the plurality of input data is simulated for data masking on the real data set D1. The masking process adopted is as follows. At each time step, while masking tosses a coin with probability q and decide to mask on seeing heads. The next decision is how many consecutive data points to be masked on seeing heads. Here, another masking hyperparameter $T_w$, is considered which is set of window lengths from which are uniformly sampled at specific length. We denote this approach compactly by WIEX (Without Imputation in Encoder with exogenous). The baselines benchmarked in the present disclosure are as follows:

1. MnI—post mean imputation (in all missing points) run a Basic Encoder Decoder (with only one encoder capturing the immediate lags),
2. MedI—post median imputation (in all missing points) run a Basic Encoder Decoder,
3. LinI—Impute using a linear interpolation, where each band of missing data point is imputed using this strategy. The center of the band is imputed with the mean while from both the left and right end the missing points are linearly interpolated.

Referring now to the steps of the method 300, at step 306, the one or hardware processors 104 obtain from the plurality of features a first context vector, from a first multi-layer RNN encoder encoded with the available data block comprising data points of a feature window in their order of occurrence, and a second context vector from a second multi-layer RNN encoder encoded with the missing data blocks. From the plurality of features received, the available data block from the first multi-layer RNN encoder are fed in the order of their occurrence. The second multi-layer RNN encoder identifies the blocks of missing data from the plurality of windows, where each missing data block is identified uniquely with two fields. Each missing data block with two fields comprises of a start time of the missing data block with reference to the start of the window and a width of the missing data block. The second multi-layer RNN encoder encodes each missing data block by obtaining a start position with its corresponding block length reaching to the next available data block. The number of time steps of the second multi-layer RNN encoder is exactly equal to the number of the one or more missing data blocks in the feature window. The start position of the missing data block is relative to the start of the feature window which is represented identical or by adding positional embedding.

Referring now to the steps of the method 300, at step 308, the one or more hardware processors 104, generate a combined context vector based on (i) the first context vector of the first multi-layer RNN encoder, and (ii) the second context vector of the second multi-layer RNN encoder.

Referring now to the steps of the method, at step 310, the one or more hardware processors 104, forecasting using a decoder, from a multi-step time series data by, (i) generating, an decoder input by appending the combined context vector with an exogenous variable at each time step; and (ii) training using a back propagation through time (BPTT), a plurality of network parameters based on a loss function. Here, the decoder performs unfolding the forecasted number of time steps and then an indicator is added at each time step of the decoder wherein, the indicator is a binary variable appended with the decoder input value as one for available data and zero for missing data. Further, the missing values are replaced with zero or any other suitable value.

Figure 4:
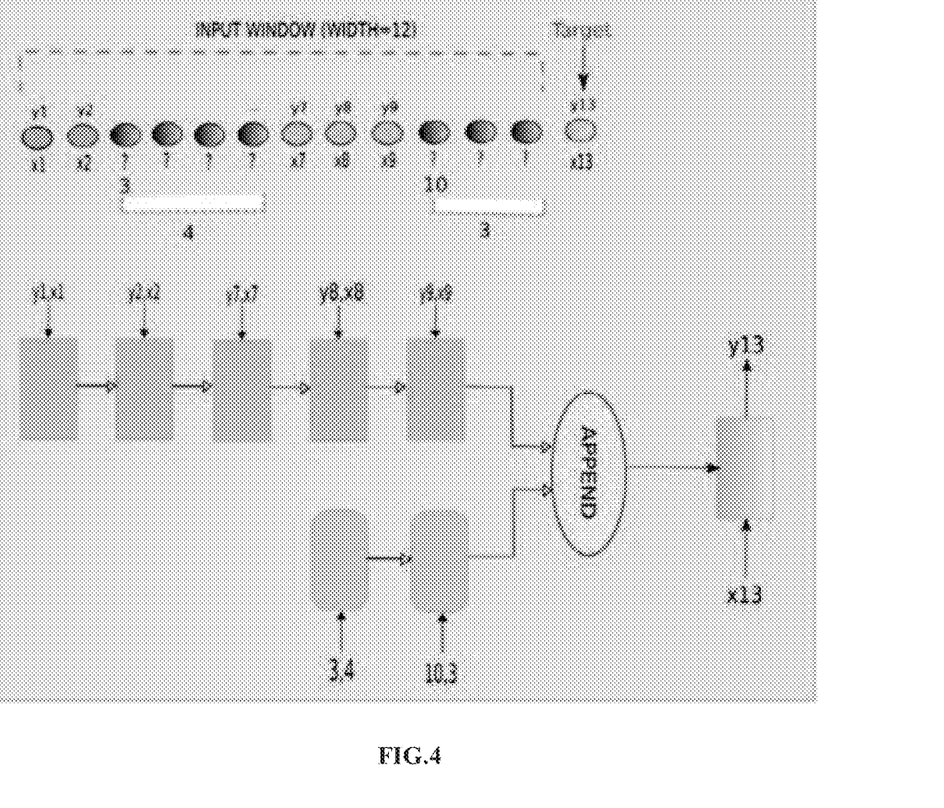
FIG. 4 illustrates a use case example to generate multi-step time series data using the system of FIG. 1, in accordance with some embodiments of the present disclosure.

FIG. 4 illustrates a use case example for generating multi-step time series prediction in presence of missing data using the system of FIG. 1, in accordance with some embodiments of the present disclosure. Here, in FIG. 4, there are five available data points in the input window of size 12. Here, all five points are observed and fed sequentially to the first multi-layer RNN encoder. The second multi-layer RNN encoder identifies the data of missing data blocks in the input window. Each missing data block is uniquely identified by two fields: (a) a start time of the block with reference to the start of the input window, and (b) a width of the block. Referring now to FIG. 4, there are two such missing data blocks. The first blocks relative start position is three, while its width is four. These two bits of information identifies the missing data block one that are fed as inputs to the first time-step of the second multi-layer RNN encoder. In general, the start time and the width information of the ith block in the input-window of the data is fed at the ith time-step of the second multi-layer RNN encoder.

Figure 5A:
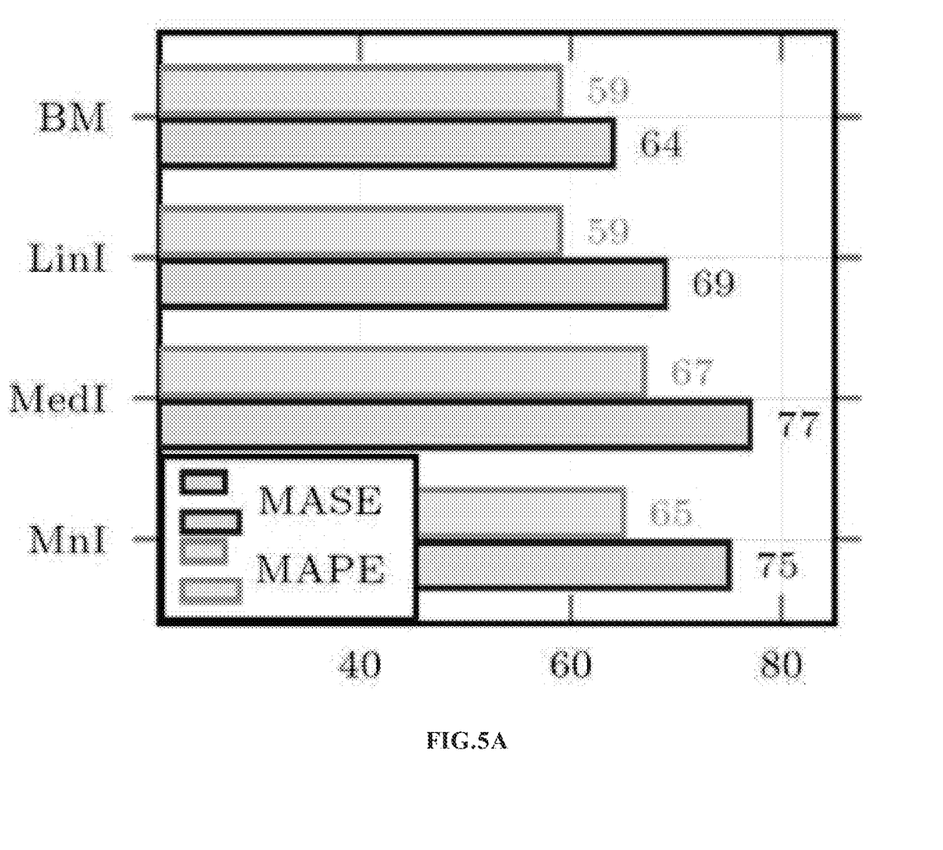
FIG. 5A and FIG. 5B illustrate a performance analysis of percentage of sequence in the multi-layer RNN based encoders, using the system of FIG. 1, in accordance with some embodiments of the present disclosure.
Figure 5B:
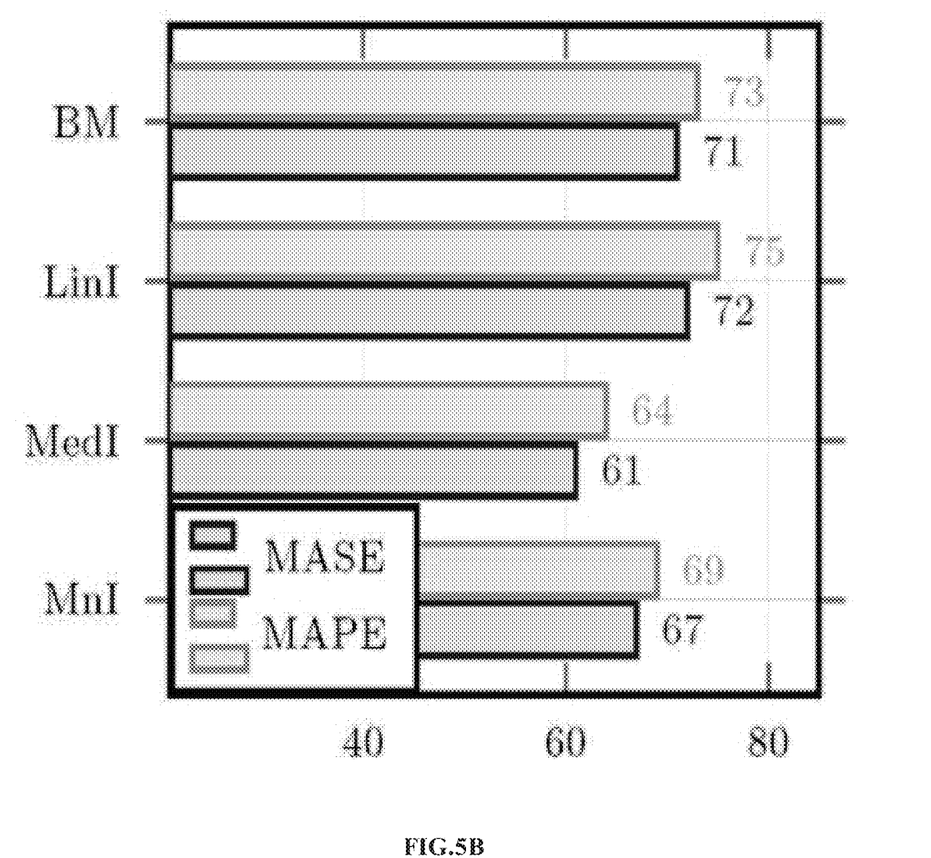

FIG. 5A and FIG. 5B illustrates a performance analysis of percentage of sequence on masked D1 and D2, using the system of FIG. 1, in accordance with some embodiments of the present disclosure. The FIG. 5A, depicts a detailed breakup of the percentage of sequences on which WIEX performs better compared to the four baselines. Experimental results of example 1, demonstrates that WIEX does better on at least 59% of the sequences and upto 75% compared to all considered baselines. Here, Table 1 depicts the average, max and min across sequences (of mean absolute scaled error (MASE) and mean absolute percentage error (MAPE)) for all methods. It demonstrates that on an average WIEX does better than all baselines based on both these complementary metrics. MASE improvements are upto 0.86 while the MAPE improvements are upto 32%.

TABLE 1

Max, Avg and Min of MASE and MAPE across all sequences

| Method | MASE based | | | MAPE based in % | | |
| --- | --- | --- | --- | --- | --- | --- |
| | Max | Avg | Min | Max | Avg | Min |
| WIEX | 2.84 | 0.81 | 0.17 | 379 | 28 | 2 |
| MnI | 9.68 | 1.66 | 0.14 | 498 | 57 | 3 |
| MedI | 8.10 | 1.67 | 0.26 | 453 | 60 | 2 |
| LinI | 8.51 | 1.67 | 0.16 | 497 | 56 | 3 |
| BM | 3.38 | 0.92 | 0.16 | 310 | 29 | 2 |

Further, Table 2 depicts the (conditional) average MASE under two conditions with respect to each baseline: (i) average over those sequences on which WIEX fares better, (ii) average over those sequences on which the baseline does better. At this level, MASE improvements of at least 0.3 while upto 1.39 are observed.

TABLE 2

Average MASE when (i) WIEX fares better (ii) Baseline fares better

| | WIEX better | | | Baseline better | | |
| --- | --- | --- | --- | --- | --- | --- |
| Method | WIEX | Baseline | Difference | WIEX | Baseline | Difference |
| MnI | 0.73 | 1.96 | 1.23 | 1.06 | 0.78 | 0.28 |
| MedI | 0.72 | 1.94 | 1.22 | 1.10 | 0.78 | 0.32 |
| LinI | 0.74 | 2.13 | 1.39 | 0.96 | 0.66 | 0.30 |
| BM | 0.73 | 1.03 | 0.30 | 0.95 | 0.73 | 0.22 |

Tab. 3 considers a similar (conditional) average MAPE. At this level of MAPE, there are improvements of at least 10% to upto 64%.

TABLE 3

Average MAPE when (i) WIEX fares better (ii) Baseline fares better

| | WIEX better | | | Baseline better | | |
| --- | --- | --- | --- | --- | --- | --- |
| Method | WIEX | Baseline | Difference | WIEX | Baseline | Difference |
| MnI | 20 | 77 | 57 | 44 | 19 | 25 |
| MedI | 20 | 79 | 59 | 46 | 20 | 26 |
| LinI | 18 | 82 | 64 | 42 | 20 | 22 |
| BM | 23 | 33 | 10 | 36 | 23 | 13 |

The experimental results of example 2 forecasted horizon chosen was of length K=12 while the test set (per sequence or item) also had 12 time points. The results in about 140 items having MASE>1, which meant these items could be tackled better by the simple copy previous baseline. <1. FIG. 5B depicts a detailed breakup of the percentage of these 257 sequences on which WIEX did better compared to the four baselines. It demonstrates that WIEX does better on at least 61% of the sequences and upto 75% compared to all considered baselines. Table 4 depicts the average, max and min across sequences (of MASE) for all methods. It demonstrates that on an average WIEX does better than all baselines based on both these complementary metrics. MASE improvements are upto 0.17.

TABLE 4

Max, Avg and Min of MASE across all sequences whose MASE <1

| Method | MASE based | | |
|---|---|---|---|
| | Max | Avg | Min |
| WIEX | 1.00 | 0.41 | 0.01 |
| Mnl | 3.31 | 0.53 | 0.02 |
| Medl | 1.56 | 0.46 | 0.01 |
| Linl | 2.70 | 0.58 | 0.02 |
| BM | 2.29 | 0.56 | 0.02 |

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problem of forecasting time series data in the presence of missing data. The present disclosure processes the plurality of input data which is transformed into two vectors fed to each RNN encoder of variable dimension. The variable length information of the first multi-step RNN encoder and the second multi-step RNN encoder are sequentially unfolded only to the extent needed. In presence of missing data blocks, the encoding scheme potentially works with larger input windows in comparison with imputation and predict strategy could. This is mainly because of the number of unfolded sequential steps in the two encoders using the present disclosure that can be significantly lower than the input window size.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:
1. A processor implemented method (300) to forecast multi-step time series data, the method comprising:
receiving (302), via a one or more hardware processors, a plurality of input data comprising a sequential data transformed into a plurality of windows without impu- tation, wherein each window is splitted into a plurality of features and a target window;

segregating (304), via the one or more hardware processors, the plurality of features into atleast one of (i) a one or more available data blocks and (ii) a one or more missing data blocks, wherein the plurality of input data is simulated for data masking on a real data set and consider a masking hyperparameter $T_w$, which is set of window lengths that are uniformly sampled at a length denoted as Without Imputation in Encoder with exogeneous (WIEX), and baselines benchmarked as (a) post mean imputation in all missing points, run a basic encoder decoder with only one encoder capturing immediate lags, (b) post median imputation in all missing points run the basic encoder decoder, (c) impute using a linear interpolation, where each band of missing data point is imputed, center of the band is imputed with the mean and from both left end and right end, the missing points are linearly interpolated;

obtaining (306) from the plurality of features, via the one or more hardware processors, a first context vector, from a first multi-layer RNN encoder encoded with the one or more available data blocks and a second context vector from a second multi-layer RNN encoder encoded with the one or more missing data blocks, wherein number of time steps of the second multi-layer RNN encoder is exactly equal to the number of one or more missing data blocks in a feature window, wherein the second multi-layer RNN encoder identifies the missing data blocks from the plurality of windows, where each missing data block is identified uniquely with two fields including a start time of the missing data block with reference to start of the window, and a width of the missing data block, wherein two bits of information pertinent to the start time of the missing data block and the width of the missing data block are fed as inputs to a first time-step of the second multi-layer RNN encoder, wherein the information of the start time and the width of an $i^{th}$ block in an input window of the data is fed at an $i^{th}$ time-step of the second multi-layer RNN encoder, wherein variable length information of the first multi-layer RNN encoder and the second multi-layer RNN encoder are sequentially unfolded only to an extent needed;

generating (308), via the one or more hardware processors, a combined context vector based on (i) the first context vector from the first multi-layer RNN encoder, and (ii) the second context vector from the second multi-layer RNN encoder; and forecasting (310) using a decoder via the one or more hardware processors, a target variable from the multi-step time series data by,
(i) generating, the decoder input by appending the combined context vector with exogenous variable at every time step; and
(ii) training using a back propagation through time (BPTT), a plurality of network parameters based on a loss function.

2. The method as claimed in claim 1, wherein the second multi-layer RNN encoder encodes the one or more missing data blocks by obtaining a start position of each missing data block with corresponding block length reaching to a next available data block.

3. The method as claimed in claim 1, wherein the decoder at each timestep performs:
(i) unfolding the forecasted number of time steps;
(ii) adding an indicator at each time step of the decoder wherein, the indicator is a binary variable appended with the decoder input value as one for available data and zero for missing data.

4. The method as claimed in claim 2, wherein the start position of each missing data block is relative to the start of the feature window.

5. A system (100), to forecast multi-step time series data comprising:
a memory (102) storing instructions;
one or more communication interfaces (106); and
one or more hardware processors (104) coupled to the memory (102) via the one or more communication interfaces (106), wherein the one or more hardware processors (104) are configured by the instructions to:
receive, a plurality of input data comprising a sequential data transformed into a plurality of windows, wherein each window is splitted into a plurality of features and a target window;
segregate, the plurality of features into atleast one of (i) a one or more available data blocks and (ii) a one or more missing data blocks, wherein the plurality of input data is simulated for data masking on a real data set and consider a masking hyperparameter $T_w$, which is set of window lengths that are uniformly sampled at a length denoted as Without Imputation in Encoder with exogeneous (WIEX), and baselines benchmarked as (a) post mean imputation in all missing points, run a basic encoder decoder with only one encoder capturing immediate lags, (b) post median imputation in all missing points run the basic encoder decoder, (c) impute using a linear interpolation, where each band of missing data point is imputed, center of the band is imputed with the mean and from both left end and right end, the missing points are linearly interpolated;
obtain from the plurality of features,
a first context vector, from a first multi-layer RNN encoder encoded with the one or more available data blocks and
a second context vector from a second multi-layer RNN encoder encoded with the one or more missing data blocks, wherein number of time steps of the second multi-layer RNN encoder is exactly equal to the number of one or more missing data blocks in a feature window,
wherein the second multi-layer RNN encoder identifies the missing data blocks from the plurality of windows, where each missing data block is identified uniquely with two fields including a start time of the missing data block with reference to start of the window, and a width of the missing data block,
wherein two bits of information pertinent to the start time of the missing data block and the width of the missing data block are fed as inputs to a first time-step of the second multi-layer RNN encoder,
wherein the information of the start time and the width of an $i^{th}$ block in an input window of the data is fed at an $i^{th}$ time-step of the second multi-layer RNN encoder,
wherein variable length information of the first multi-layer RNN encoder and the second multi-layer RNN encoder are sequentially unfolded only to an extent needed;

generate, a combined context vector based on (i) the first context vector from the first multi-layer RNN encoder, and (ii) the second context vector from the second multi-layer RNN encoder; and forecast using a decoder, a target variable from the multi-step time series data by,
(i) generate, the decoder input by appending the combined context vector with an exogeneous variable at every time step;
(ii) train, using a back propagation through time (BPTT), a plurality of network parameters based on a loss function.

6. The system (100) as claimed in claim 5, wherein the second multi-layer RNN encoder encodes the one or more missing data blocks by obtaining a start position of each missing data block with corresponding block length reaching to a next available data block.

7. The system (100) as claimed in claim 5, wherein the decoder at each timestep performs:
(i) unfolding the forecasted number of time steps;
(ii) adding an indicator at each time step of the decoder wherein, the indicator is a binary variable appended with the decoder input value as one for available data and zero for missing data.

8. The system (100) as claimed in claim 5, wherein the start position of each missing data block is relative to the start of the feature window.

9. One or more non-transitory machine-readable information storage mediums comprising one or more instructions which when executed by one or more hardware processors perform actions comprising:

receive, a plurality of input data comprising a sequential data transformed into a plurality of windows, wherein each window is splitted into a plurality of features and a target window;

segregate, the plurality of features into atleast one of (i) a one or more available data blocks and (ii) a one or more missing data blocks, wherein the plurality of input data is simulated for data masking on a real data set and consider a masking hyperparameter $T_w$, which is set of window lengths that are uniformly sampled at a length denoted as Without Imputation in Encoder with exogeneous (WIEX), and baselines benchmarked as (a) post mean imputation in all missing points, run a basic encoder decoder with only one encoder capturing immediate lags, (b) post median imputation in all missing points run the basic encoder decoder, (c) impute using a linear interpolation, where each band of missing data point is imputed, center of the band is imputed with the mean and from both left end and right end, the missing points are linearly interpolated;

obtain from the plurality of features,
a first context vector, from a first multi-layer RNN encoder encoded with the one or more available data blocks and a second context vector from a second multi-layer RNN encoder encoded with the one or more missing data blocks, wherein number of time steps of the second multi-layer RNN encoder is exactly equal to the number of one or more missing data blocks in a feature window, wherein the second multi-layer RNN encoder identifies the missing data blocks from the plurality of windows, where each missing data block is identified uniquely with two fields including a start time of the missing data block with reference to start of the window, and a width of the missing data block, wherein two bits of information pertinent to the start time of the missing data block and the width of the missing data block are fed as inputs to a first time-step of the second multi-layer RNN encoder, wherein the information of the start time and the width of an $i^{th}$ block in an input window of the data is fed at an $i^{th}$ time-step of the second multi-layer RNN encoder, wherein variable length information of the first multi-layer RNN encoder and the second multi-layer RNN encoder are sequentially unfolded only to an extent needed;

generate, a combined context vector based on (i) the first context vector from the first multi-layer RNN encoder, and (ii) the second context vector from the second multi-layer RNN encoder; and forecast using a decoder, a target variable from the multi-step time series data by,
(i) generate, the decoder input by appending the combined context vector with an exogeneous variable at every time step;
(ii) train, using a back propagation through time (BPTT), a plurality of network parameters based on a loss function.

10. The one or more non-transitory machine-readable information storage mediums of claim 9, wherein the second multi-layer RNN encoder encodes the one or more missing data blocks by obtaining a start position of each missing data block with corresponding block length reaching to a next available data block.

11. The one or more non-transitory machine-readable information storage mediums of claim 9, wherein the decoder at each timestep performs:
(i) unfolding the forecasted number of time steps;
(ii) adding an indicator at each time step of the decoder wherein, the indicator is a binary variable appended with the decoder input value as one for available data and zero for missing data.

12. The one or more non-transitory machine-readable information storage mediums of claim 9, wherein the start position of each missing data block is relative to the start of the feature window.

* * * * *